Oct. 14, 1958　　　W. B. BOICE　　　2,855,962
FEED MECHANISM FOR CONTOUR SAWING MACHINE
Filed May 3, 1955　　　　　4 Sheets-Sheet 1
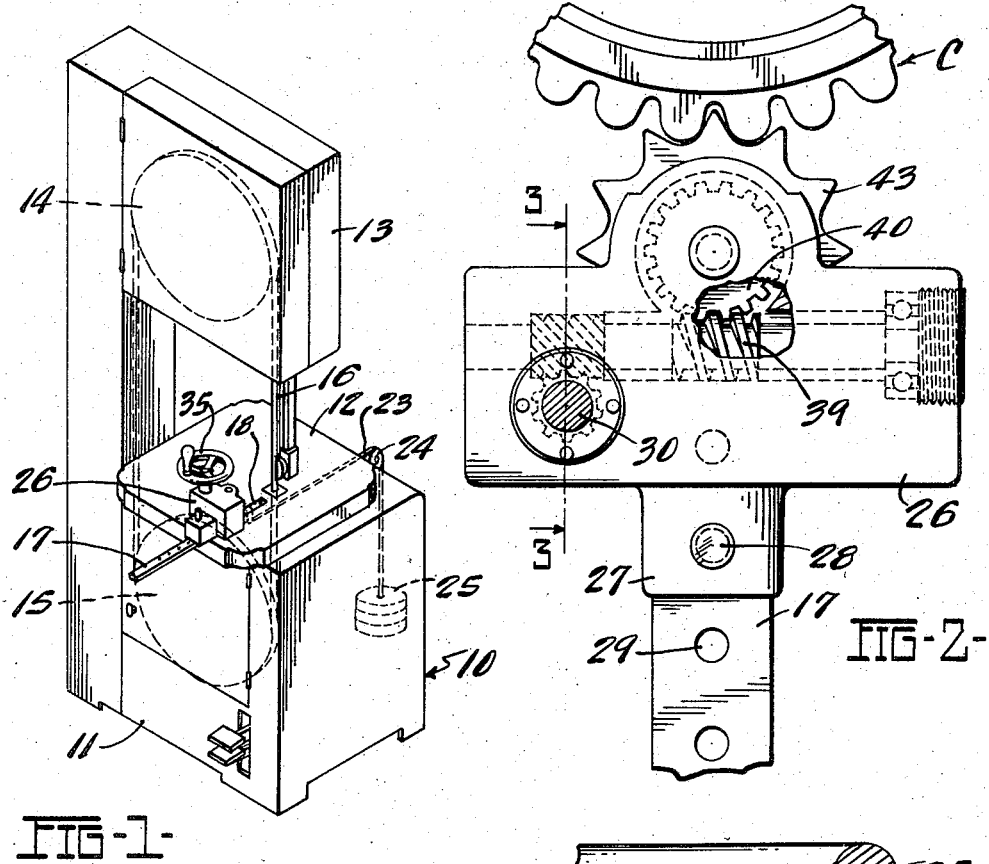
FIG-1-
FIG-2-
FIG-3-
INVENTOR:
WILLIAM B. BOICE.
BY
Malcolm W. Fraser
ATTY.

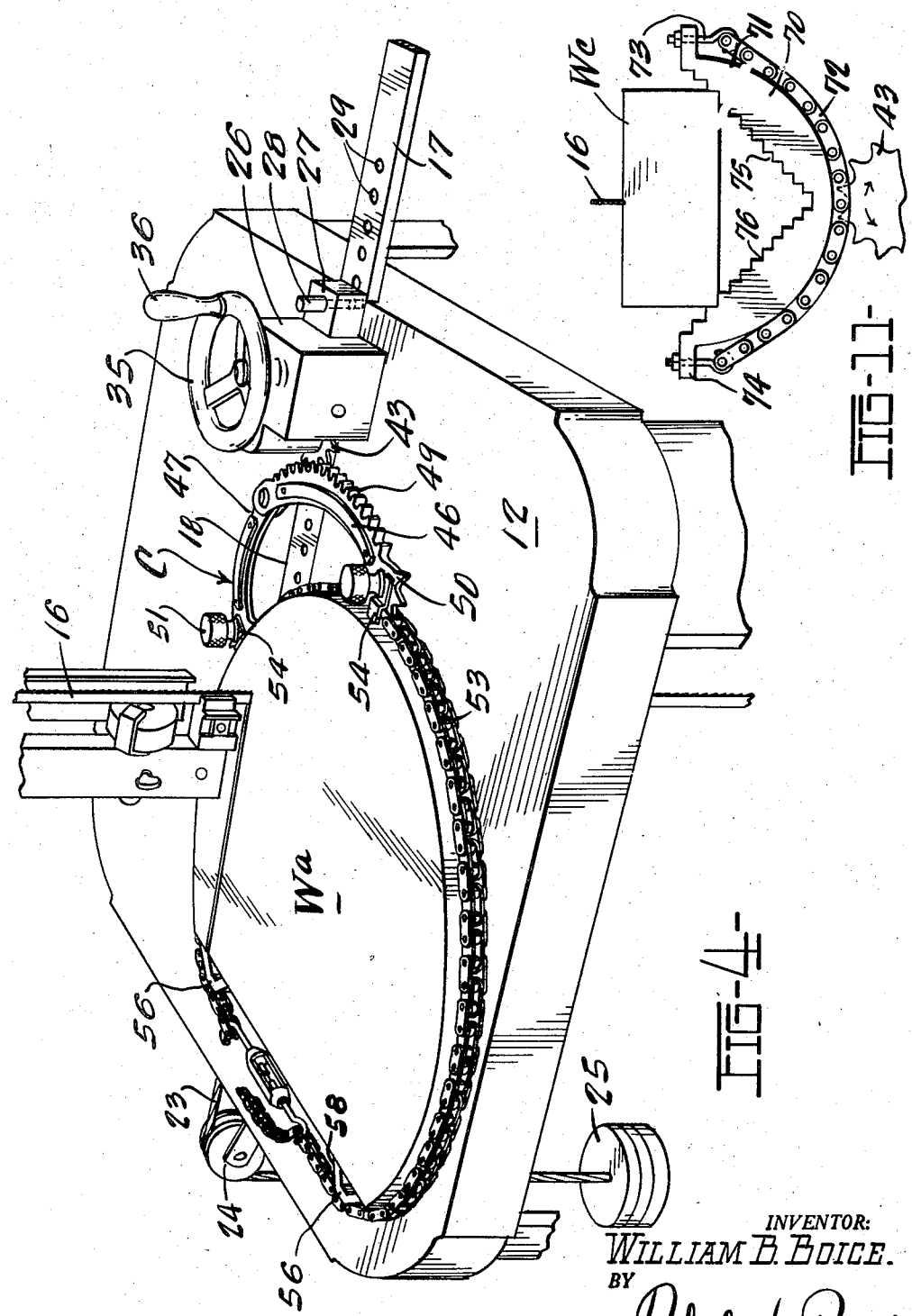

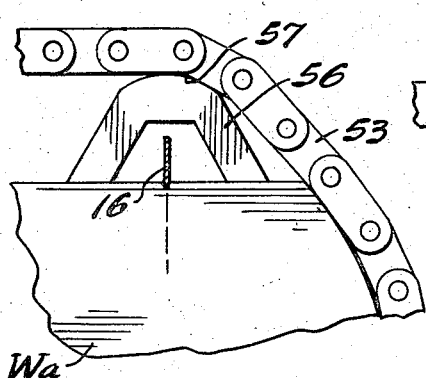
FIG-12-
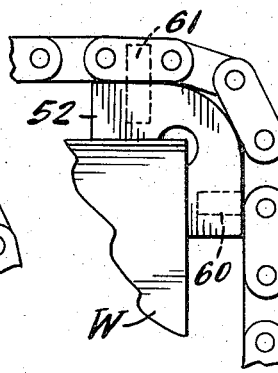
FIG-13-
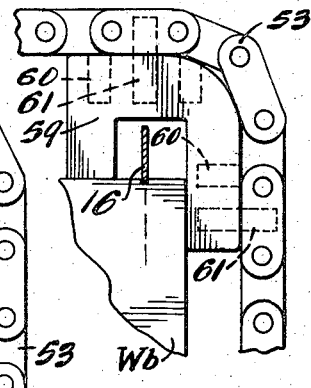
FIG-14-
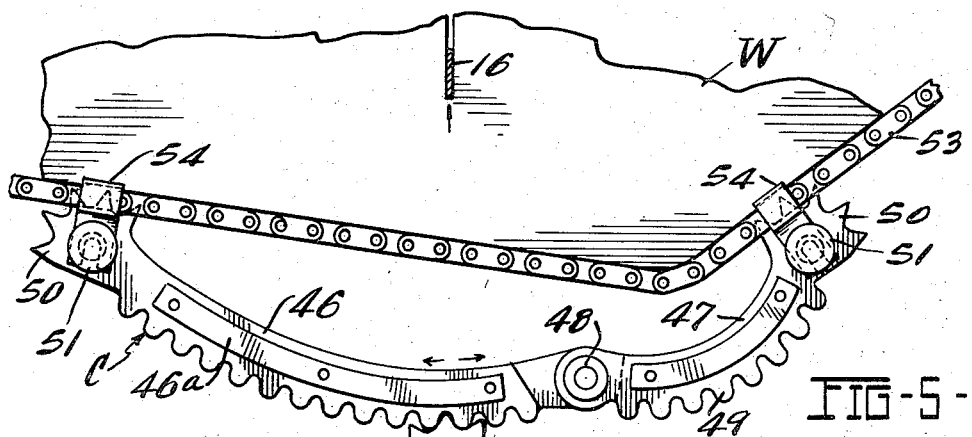
FIG-5-
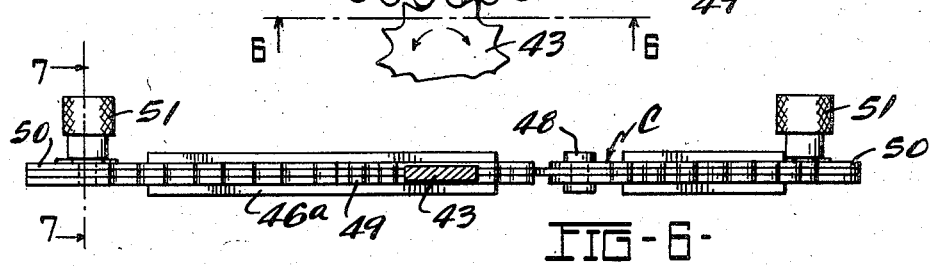
FIG-6-
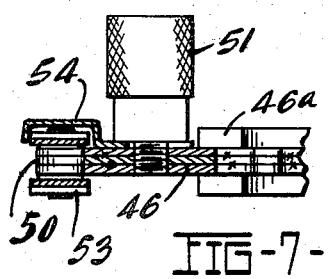
FIG-7-
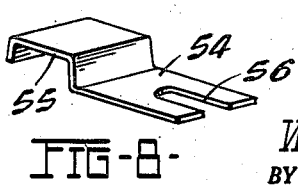
FIG-8-
INVENTOR:
WILLIAM B. BOICE
BY
ATTY.

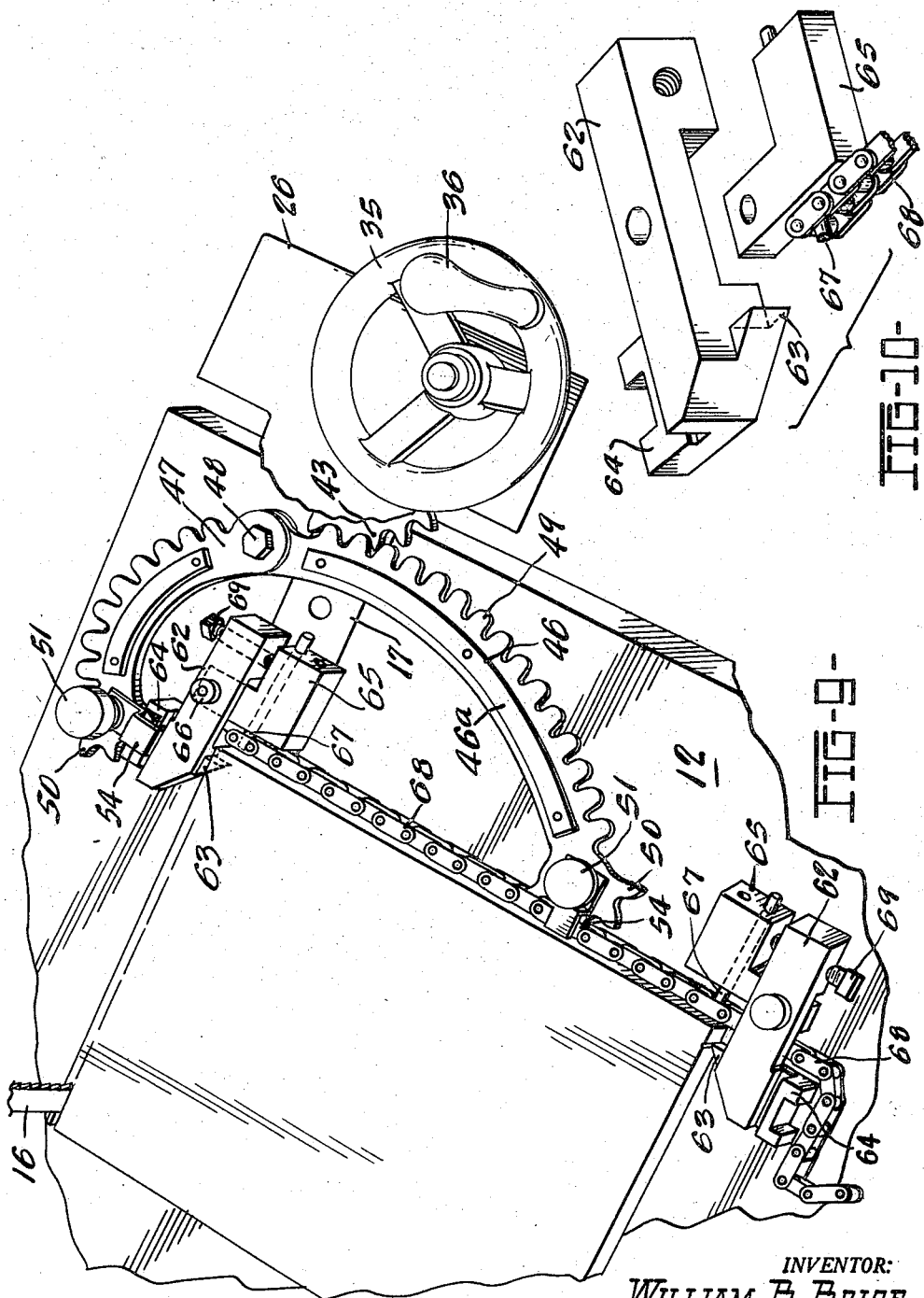

United States Patent Office 2,855,962
Patented Oct. 14, 1958

2,855,962

FEED MECHANISM FOR CONTOUR SAWING MACHINE

William B. Boice, Toledo, Ohio, assignor to Boice-Crane Company, Toledo, Ohio, a corporation of Ohio Application May 3, 1955, Serial No. 505,687

9 Claims. (Cl. 143—26)

This invention relates to power driven tools but particularly to contour sawing machines. In such machines the work piece is urged towards the saw and maneuvered relative to the saw blade to effect the desired cutting action along a predetermined contour line. It is a desideratum to feed the work piece in a direct line with the saw blade and to prevent side thrusts on the blade during feeding and maneuvering regardless the size or shape of the work piece. An object is to produce simple and efficient mechanism for achieving such results.

Another object is to produce new and improved mechanism for accomplishing directional sawing control so that the work piece can be more readily and conveniently moved as desired and secured in any selected position of adjustment.

A further object is to produce a force compensator for increasing the leverage in the actuation of the work piece; for making possible sawing around a curved line, for example, with pressure applied to the compensator by the sawing control mechanism at nearly 90° to the engaged surface of the compensator; and for simplifying the control of large or bulky work pieces.

A still further object is to produce several forms of work holders for facilitating movement and steering of the work pieces, particularly when used in conjunction with the sawing control mechanism and/or force compensator as hereinafter described.

Other objects and advantages will hereinafter appear, and for purposes of illustration but not of limitation, embodiments of the invention are shown in the accompanying drawings in which Figure 1 is a front perspective view of a machine embodying the invention;

Figure 2 is a fragmentary top plan view of the sawing control taken on the line 2—2 of Figure 3;

Figure 3 is a vertical sectional view on the line 3—3 of Figure 2;

Figure 4 is an enlarged fragmentary perspective view of the table top showing the work piece controlled by the sawing control mechanism and the force compensator interposed between such control and the work piece;

Figure 5 is a top plan view of the force compensator applied to the work piece;

Figure 6 is a sectional view on the line 6—6 of Figure 5;

Figure 7 is an enlarged sectional view on the line 7—7 of Figure 6;

Figure 8 is a perspective view of a retainer;

Figure 9 is a top perspective view of a work piece control assembly showing another form of work holder;

Figure 10 is a perspective view of the parts of a work holder shown in Figure 9;

Figure 11 (Sheet 2) is a top plan view of a V block form of worker holder;

Figure 12 (Sheet 3) is a fragmentary plan view of another form of work holder of V form which abuts the work piece;

Figure 13 is a fragmentary plan view of a corner block work holder; and

Figure 14 is a fragmentary plan view of an L-shaped corner block work holder.

The illustrated embodiment of the invention comprises a sawing machine 10 which has an upright base 11 provided with a work table 12. Connected to the base and overhanging the table 12 is a pedestal portion 13. Mounted in the pedestal portion 13 and base 11 are pulleys 14 and 15 respectively, about which is trained an endless, flexible saw 16. When light work is to be sawed, it can be conveniently maneuvered by hand, but not so for heavy pieces and this invention is concerned principally with heavier work requiring a mechanical feed and greater feeding pressure.

The work is fed with respect to the saw blade 16 by a feed bar 17, the top surface of which is flush with the table 12 and rides in a slideway 18 formed in the table in alignment with the saw blade. As shown in Figure 3, a series of ratchet teeth 19 are on the underside of the feed bar 17. Beneath the feed bar 17 and shiftable in parallel relationship to the feed bar is an actuating slide 20 guided by a channel 21. The slide 20 carries a pivoted pawl 22 of bell crank form with an arm thereof depending so that the pawl can be released from the teeth 19. The slide 20 is held under constant tension by a cable 23 which is trained over a pulley 24 and carries a series of weights 25. In this manner the feed bar 17 is constantly urged in a direction toward the saw 16 and, as will hereinafter appear, urges the work piece toward the saw blade.

Sawing control mechanism is provided and, as shown, such mechanism comprises a metal housing 26 which is formed with a rearward extension at its lower end, the extension being vertically apertured to receive a locating pin 28, selectively to fit one of a row of spaced holes 29 in the feed bar 17. At one side of the housing 26 (Figure 2) is a vertical shaft 30 mounted in ball-bearings 31, the ball-bearing unit being held in place by a screw-plug 32. The lower end of the shaft 30 has a reduced extension 33 which has a bearing fit in an aperture 34 of the housing. The shaft 30 projects upwardly above the housing and on the upper end thereof is mounted a hand wheel 35 equipped with an operating knob 36.

The shaft 30 is within a cavity 37 formed in the housing 26 and formed on the shaft 30 is a gear 38 meshing with a worm 39 suitably mounted within the housing and disposed at right angles to the shaft 30. The worm 39 meshes with the worm wheel 40 which is rotatably mounted on a vertical shaft or axle 41 secured in position by a set screw 41a (Figure 3). Integral with the worm wheel 40 is a depending sleeve 42 with which a sprocket wheel 43 is integral at its lower end. The sprocket 43 is spaced from the feed bar 17 and is supported by a disk 44 integral with the axle 41. The axle 41 has a reduced extension 45 which depends below the disk 44 to enter one of the holes 29 in the feed bar 17. Thus it will be understood that the pin 28 and extension 45 are spaced from each other so that each can enter one of the holes in the feed bar 17 and thus adjustably and securely retaining the sawing control mechanism in the desired or selected position.

It is the sprocket 43 which applies straight line or rotational force to the work piece and it will be understood that the sprocket can operate in various ways. In the simplest case, a sprocket tooth can make direct contact with a small work piece when making a straight cut square to the front face of the piece. However, as the work pieces increase in size, or the saw cuts become off-center, the friction of the sprocket tooth against the work piece is inadequate to overcome the drag of the work piece over the table. Vibration caused by the saw blade can also reduce the "steering" effect of the sprocket tooth acting directly on the work piece. When this point is reached, directional control of the saw cut is lost, and more positive holding means for the work piece is required.

Force compensating mechanism is provided and consists of a pair of hingedly connected sectors 46 and 47 (Figs. 4, 5, 6 and 9), each sector having top and bottom spacer strips 46a, the hinge connection 48 enabling the sectors to be swung relatively to each other to conform to the shape of the work piece. The sectors are made up of a series of horizontal laminations welded together and are of various radii depending upon the conformation of the particular work piece. By opening up the sectors or moving them toward each other to the proper angle and engaging the free ends of the sectors, as will hereinafter appear, a position can be attained where sawing can continue around a curved line with pressure from the sprocket 43 applied at nearly 90°. The sectors are designed to include only about 20° of arc of each side of the center line of the saw blade so that tangential force does not become excessive. Each of the sectors is formed on the outer side with teeth 49 which simulate the pins of a roller chain and are such as can be engaged and actuated by teeth of the sprocket 43.

At each free end of the compensator is an arcuate series of terminal sprocket teeth 50, certain of which are adapted to enter the links of a roller chain as will hereinafter be described. These sprocket teeth are formed on enlargements at the free end of each of the sectors 46 and 47. The sprocket teeth 50 may be secured to the roller chain by sheet metal retainers 54 (Figs. 5 and 8), each of which is formed with a hooked end 55 to hook over the chain and a slot 56 which is engaged by a thumb-screw 51 having a knurled head thereby insuring that the compensator is secured positively to the chain.

It is common practice to wrap a roller chain around the work as shown in Figure 4, but the method of attaching the chain as illustrated in Figure 9 offers advantages in many instances. The simplest method of holding utilizes a right-hand and a left-hand corner chain clamp with a chain running across only one side and bearing directly against the work piece. Likewise the chain can be extended along two or three sides of a rectangular work piece, providing the saw cut can be started. The chain can be attached to irregularly shaped pieces in this manner, the only requirement being that two corners of 90° or less must be provided to engage the clamps. When the work piece must be more positively held, or where the sawing to be done involves rotating the work piece through a complete circle, corner blocks 52, as indicated on Figure 13, 56 of Figure 12, and 59 of Figure 14 are used, around which a roller chain is wrapped. Rounded corners permit the chain to conform freely to the outline of the blocks. In this conection, holes 60, 61 are drilled in the blocks in the desired places to receive pins 67, as shown in Figure 9, inserted through openings of the roller chain. By suitably varying the space between the holes in relation to the pitch of the chain, it is possible to place the pins so that there will be only slight movement as the chain is tightened about the work piece. Manifestly, several of these corner blocks may be used about the work piece and the chain tightened thereabout. This has the additional feature of increasing the weight of the work piece which can be handled directly on the table 12.

As shown in Figure 12 and also in Figure 4, a spacer block 56 of generally V-shaped form may abut against the work piece Wa to accommodate the saw blade 16. These blocks have arcuate ends 57 over which the roller chain 53 engages. Opposite sides 58 of the block incline outwardly.

In some instances, a corner block 59, as shown in Figure 14, is desirable, particularly where the cut is at one side of the work piece. This block is also rounded exteriorly to accommodate the roller chain and is of somewhat U-shape with one side longer than the other to overlap a side of the work piece. This block has drilled holes 60, through which pins 61 extend into openings in the roller chain for effecting a positive retention of the chain with respect to the block.

A holding device is shown on Figures 9 and 10 embodying right and left-hand corner clamps which are formed in two parts. One part 62 is elongate and has a work engaging tooth 63 to bite into an edge wall of the work piece. Formed on this part on the side opposite to the tooth 63 is a tooth receiving socket 64 which is adapted to receive two of the sprocket teeth 50 of the adjacent compensator sector. The other part of the block is generally L-shaped with one portion sliding into the part 62 substantially as shown, a cap-screw 66 connecting these two parts together. On the side edge of the part 65 facing the roller chain are holes to receive a pin 67 which enters an opening in the chain for positively holding the chain in position, the chain being indicated at 68. An adjusting screw 69 carried by the part 62 engages the part 65 for forcing the parts to their respective operative positions. In this form the sector 46 of the force compensator engages the roller chain as above described, the sprocket teeth 50 entering the holes in the chain and a retainer 54 securing the parts in position. The left-hand block is similarly attached to the opposite corner of the work piece and retains the chain properly in position.

For smaller work pieces requiring simple cuts, a V-shaped block 70, as shown in Figure 11, may be used. This block has a curvilinear outer side 71 about which a roller chain 72 engages, the ends of the chain being engaged by hooks 73 which are carried by lateral flanges 74 of the block. On the inside of the block or the V-shaped portion 75 there are a series of oppositely aligned steps 76, which enable different size work pieces Wc to be engaged as will be readily apparent, thus enabling a wide variety of shapes and sizes of work pieces to be held for either straight or contour sawing.

From the above description, it will be manifest that with the work piece on the table and engaged by a roller chain and the force compensator C applied in one or another of the forms illustrated, it is apparent that the control mechanism can then be moved so that the sprocket 43 engages the teeth 49 of one or the other sectors and urges the work piece in a straight line with respect to the saw blade 16. By turning the wheel 35, the work piece can be moved in the desired fashion and as the work piece is so moved and the angle of the compensator changes, a tangential force develops which the worm gear 39 controls and the feed bar 17 absorbs without any of it being imposed on the saw blade 16. As above mentioned, the sectors of the compensator can be of different radii. Manifestly the compensator serves another important purpose by increasing the rotative leverage on the work piece as determined by the distance between the saw blade 16 and the sprocket 43. For example, assume that the chain is attached directly to the work piece and the sprocket 43 engages the chain. As the saw cut nears completion, the distance between the saw blade 16 and the pitch line of the sprocket approaches the minimum of $3/16$ of an inch, which is the leverage available to control the direction of the saw cut. In many cases, this is not adequate for satisfactory control of the sawing, but with the compensator disposed between the chain and the sprocket 43, leverage is increased for satisfactory sawing at the end of the cut. Manifestly, maneuvering for contour sawing is greatly facilitated and a positive control is at all times had, the worm and worm wheel securing the work in the desired position.

Numerous changes in details of construction, arrangement and operation may be effected without departing

What I claim is:

1. A force compensator of the character described comprising a pair of hingedly connected sectors, a series of sprocket engaging teeth on the bowed outer sides of the sectors, and attaching means on the free end of each sector for assisting in connecting the compensator to a work piece.

2. A force compensator of the character described comprising a pair of hingedly connected sectors, a series of sprocket engaging teeth on the bowed outer sides of the sectors, and sprocket teeth on the free end of each sector for assisting in connecting the compensator to a work piece.

3. A force compensator of the character described comprising a pair of hingedly connected sectors, a series of sprocket engaging teeth on the bowed outer sides of the sectors, sprocket teeth on the free end of each sector for engagement to a member anchored to a work piece, and hook-like retainers associated with said sprocket teeth for securing the compensator to such member.

4. Work holder for cooperation with a chain for holding a work piece on a table in proper position relative to an operating tool and aiding in the maneuvering of the work piece relative to the tool, said holder comprising in combination with a rectangular work piece having a relatively straight side opposite to the location of the operating tool, a roller-type chain disposed along such side, a work holder body at opposite corners of the work piece and each consisting of a pair of pivoted parts, one part having means positively engaging the adjacent portion of the chain, the other part having a tooth for biting into the work piece, and means for rocking said parts relative to each other for respectively forcing the tooth into the work piece and the engaging means into openings of the chain.

5. Work holder as claimed in claim 4, comprising a socketed portion on the body part having the tooth for receiving an end portion of a force compensation, the opposite end of which is connected to the chain.

6. In a machine having a work table, a tool operating in a path intersecting the table top, and a feed bar on the table urged toward the tool, the improvement which comprises a sprocket tooth-receiving member attached to the work piece on the table top with a portion extending crosswise of the feed bar, said sprocket tooth-receiving member including a force compensator comprising a pair of hingedly connected sectors of different radii, and sprocket-engaging teeth on the outer sides of said sectors respectively, a control mechanism on the feed bar and including a manual actuating member, a sprocket wheel engageable with the teeth on said sectors in response to said actuating member, and means for mounting said mechanism on the feed bar for movement therewith.

7. In a machine having a work table, a tool operating in a path intersecting the table top, and a feed bar on the table urged toward the tool, the improvement which comprises a sprocket tooth-receiving member attached to the work piece on the table top with a portion extending crosswise of the feed bar, said sprocket tooth-receiving member including a force compensator comprising a pair of hingedly connected sectors of different radii, sprocket-engaging teeth on the outer sides of said sectors respectively, a roller chain on at least a portion of the periphery of the work piece for the tool, and teeth on the free ends of said sectors for engaging openings in said chain, a control mechanism on the feed bar and including a manual actuating member, a sprocket wheel engageable with the teeth on said sectors and moveable in response to said actuating member, and means for mounting said mechanism on the feed bar for movement therewith.

8. In a machine having a work table, a tool operating in a path intersecting the table top, and a feed bar on the table urged toward the tool, the improvement which comprises a sprocket tooth-receiving member attached to the work piece on the table top with a portion extending crosswise of the feed bar, said sprocket tooth-receiving member including a force compensator comprising a pair of hingedly connected laminated sectors of different radii, longitudinally elongate spacer strips on the bottom sides of the sectors respectively for sliding engagement with the table top, and sprocket-engaging teeth on the outer sides of said sectors respectively, a control mechanism on the feed bar and including a manual actuating member, a sprocket wheel engageable with the teeth on said sectors moveable in response to said actuating member, and means for mounting said mechanism on the feed bar for movement therewith.

9. In a machine having a work table, a tool operating in a path intersecting the table top, and a feed bar on the table urged toward the tool, the improvement which comprises a sprocket tooth-receiving member attached to the work piece on the table top with a portion extending crosswise of the feed bar, said sprocket tooth-receiving member including a force compensator comprising a pair of hingedly connected sectors of predetermined radii, sprocket-engaging teeth on the outer sides of said sectors respectively, a roller chain on at least a portion of the periphery of the work piece for the tool, teeth on the free ends of said sectors for engaging openings in said chain, and retainers for securing the free end of each sector to the roller chain, control mechanism on the feed bar and including a manual actuating member, a sprocket wheel engageable with the teeth on said sectors moveable in response to said actuating member, and means for mounting said mechanism on the feed bar for movement therewith.

References Cited in the file of this patent

UNITED STATES PATENTS

| | | |
|---|---|---|
| 1,741,082 | Thiel | Dec. 24, 1929 |
| 2,296,967 | Wilkie | Sept. 29, 1942 |
| 2,311,426 | Wilkie | Feb. 16, 1943 |
| 2,364,969 | Grob et al. | Dec. 12, 1944 |
| 2,384,732 | Ocenasek | Sept. 11, 1945 |